United States Patent
Liu et al.

(10) Patent No.: US 10,574,832 B1
(45) Date of Patent: Feb. 25, 2020

(54) CALL REDIRECT FROM MOBILE DEVICE IN IPBX

(71) Applicant: 8x8, Inc., San Jose, CA (US)

(72) Inventors: Zhishen Liu, San Jose, CA (US); Garth Judge, San Jose, CA (US); Bryan Martin, San Jose, CA (US)

(73) Assignee: 8x8, Inc., San Jose, CA (US)

( * ) Notice: Subject to any disclaimer, the term of this patent is extended or adjusted under 35 U.S.C. 154(b) by 601 days.

(21) Appl. No.: 14/493,217

(22) Filed: Sep. 22, 2014

Related U.S. Application Data

(60) Provisional application No. 62/019,204, filed on Jun. 30, 2014.

(51) Int. Cl.
| | |
|---|---|
| *H04M 7/12* | (2006.01) |
| *H04M 3/58* | (2006.01) |
| *H04W 4/16* | (2009.01) |
| *H04M 3/42* | (2006.01) |
| *H04M 7/00* | (2006.01) |
| *H04W 40/34* | (2009.01) |

(52) U.S. Cl.
CPC ....... *H04M 7/128* (2013.01); *H04M 3/42314* (2013.01); *H04M 3/58* (2013.01); *H04M 7/0006* (2013.01); *H04M 7/129* (2013.01); *H04W 4/16* (2013.01); *H04W 40/34* (2013.01)

(58) Field of Classification Search
CPC ............ H04M 7/128; H04M 3/42314; H04M 7/0006; H04M 7/129; H04M 3/58; H04W 4/16; H04W 40/34
See application file for complete search history.

(56) References Cited

U.S. PATENT DOCUMENTS

| | | | |
|---|---|---|---|
| 6,256,512 B1 * | 7/2001 | Verdonk ............ | H04M 3/4228 455/462 |
| 7,356,307 B1 * | 4/2008 | Parker ............... | H04M 3/42263 370/352 |
| 8,300,634 B2 | 10/2012 | Narayanaswamy | |
| 9,264,536 B1 * | 2/2016 | Saitawdekar ..... | H04M 3/42059 |
| 2003/0059005 A1 * | 3/2003 | Meyerson ............... | H04L 51/36 379/88.17 |
| 2005/0282543 A1 * | 12/2005 | Idnani ............... | H04L 29/06027 455/432.1 |
| 2006/0030357 A1 * | 2/2006 | McConnell ....... | H04M 3/42314 455/554.1 |

(Continued)

*Primary Examiner* — Ajit Patel
*Assistant Examiner* — Wilfred Thomas
(74) *Attorney, Agent, or Firm* — Crawford Maunu PLLC

(57) ABSTRACT

Apparatus and methods concerning call routing are disclosed. As an example, one apparatus includes an interface circuit configured to route calls between a cellular network or PSTN and a plurality of communication devices on an IP network, each of the plurality of communication devices corresponding to a respective telephone extension. In response to receiving a first call notification from one of a plurality of mobile devices, a processing circuit of the apparatus caches the call notification for a period of time in a first database. A first call notification indicates a source number and a destination number. In response to a first incoming call via the cellular or PSTN network from the source number included in the cached call notification, the processing circuit redirects the call to the destination number indicated in the call notification via the cellular or PSTN network.

20 Claims, 6 Drawing Sheets

(56) References Cited

U.S. PATENT DOCUMENTS

| | | | | |
|---|---|---|---|---|
| 2008/0159516 A1* | 7/2008 | Freeman | ............ | H04M 3/4228 |
| | | | | 379/221.14 |
| 2009/0023450 A1* | 1/2009 | George | ................... | H04L 12/66 |
| | | | | 455/442 |
| 2010/0080214 A1* | 4/2010 | Li | ....................... | H04W 84/105 |
| | | | | 370/352 |
| 2010/0130169 A1* | 5/2010 | Narayanaswamy | .... | H04L 63/08 |
| | | | | 455/411 |
| 2011/0182281 A1* | 7/2011 | Siddique | ............... | H04M 7/003 |
| | | | | 370/352 |
| 2011/0281580 A1* | 11/2011 | Tonogai | ............ | H04M 3/42314 |
| | | | | 455/426.1 |
| 2014/0126427 A1* | 5/2014 | Elizarov | ................ | H04L 69/28 |
| | | | | 370/259 |

* cited by examiner

CALL REDIRECT FROM MOBILE DEVICE IN IPBX

RELATED DOCUMENTS

This patent document claims benefit, under 35 U.S.C. § 119(e), of U.S. Provisional Patent Application Ser. No. 62/019,204, filed on Jun. 30, 2014, and entitled "CALL REDIRECT FROM MOBILE DEVICE IN IPBX," which is fully incorporated herein by reference.

FIELD OF THE INVENTION

The disclosure relates generally to communication systems and, more particularly, to telephone services.

OVERVIEW

The communications industry continues to rely upon advances in technology to realize higher-functioning systems at cost-effective prices. Telephony signals can now be transmitted by methods and systems including traditional public standard telephone networks (PSTNs), Internet telephony service providers (FTSP), packet-based systems, digital wireless systems, analog wireless systems, private branch exchanges (PBX), cable systems, T1 systems, integrated service digital networks (ISDN) and digital subscriber line (DSL) systems, to name a few.

SUMMARY

An apparatus is disclosed that includes an interface circuit configured to route calls between a cellular network or PSTN and a plurality of communication devices on an IP network. Each of the plurality of communication devices corresponds to a respective telephone extension. The apparatus also includes a processing circuit, configured to perform default PBX routing services. For each of the telephone extensions, the default PBX routing services include routing a call via the IP network to the communication devices in response to an incoming call to the telephone extension associated with the communication device. In performing the default PBX routing services, the processing circuit also places outgoing calls via a telephone extension in response to one of the plurality of communication devices that is assigned the telephone extension. For one or more of the plurality of telephone extensions, the processing circuit is configured to place an outgoing call via the telephone extension in response to one of a plurality of mobile devices, which is not included in the plurality of communication devices. In response to receiving a call notification from the mobile device, the processing circuit caches the call notification for a period of time in a first database. The call notification indicates a source number and a destination number. In response to an incoming call via the cellular or PSTN network from the source number included in the cached call notification, the processing circuit redirects the call to the destination number indicated in the call notification via the cellular or PSTN network.

A method is also disclosed for routing calls on an IP network, including a plurality of communication devices on an IP network. Each of the plurality of communication devices is assigned a respective telephone extension. Default private branch exchange routing services are performed for each of the plurality of telephone extensions. The default PBX routing services include routing a call via the IP network to one of the plurality of communication devices in response to an incoming call to the telephone extension that is assigned to the communication device. The default PBX routing services also include placing outgoing calls via an telephone extension, in response to one of the plurality of communication devices that is assigned the telephone extension.

In addition to the default PBX routing, for at least one of the telephone extensions, an outgoing call is placed via the telephone extension in response to a mobile device, which is not included in the plurality of communication devices. Placing of the outgoing call includes, in response to receiving, from one of a plurality of mobile devices, a call notification indicating a source number and a destination number, the call notification is stored for a period of time in a first database. In response to an incoming call via the cellular network or PSTN from the source number included in the stored call notification, the call is redirected to the destination number indicated in the call notification via the cellular network or PSTN.

A second method for routing calls is also disclosed. Calls are routed between a cellular network or PSTN and a plurality of communication devices on an IP network. Each of the plurality of communication devices is assigned a respective telephone extension. Default private branch exchange routing services are performed for each of the plurality of telephone extensions. The default PBX routing services include routing a call via the IP network to one of the plurality of communication devices in response to an incoming call to the telephone extension that is assigned to the communication device. The default PBX routing services also include placing outgoing calls via a telephone extension, in response to one of the plurality of communication devices that is assigned the telephone extension.

In addition to the default PBX routing, for at least one of the telephone extensions, an outgoing call is placed via the telephone extension in response to a mobile device, which is not included in the plurality of communication devices. Placing of the outgoing call includes receiving a first call notification, indicating a source number and a destination number, from one of a plurality of mobile devices. In response to the first call notification, a first outgoing call to the source number is initiated via the cellular network or PSTN. A second outgoing call to the destination number is also initiated via the cellular network or PSTN and the first and second outgoing calls are merged.

BRIEF DESCRIPTION OF THE FIGURES

The disclosure may be more completely understood in consideration of the following detailed description of various embodiments of the disclosure, in connection with the accompanying drawings in which.

Figure 1:
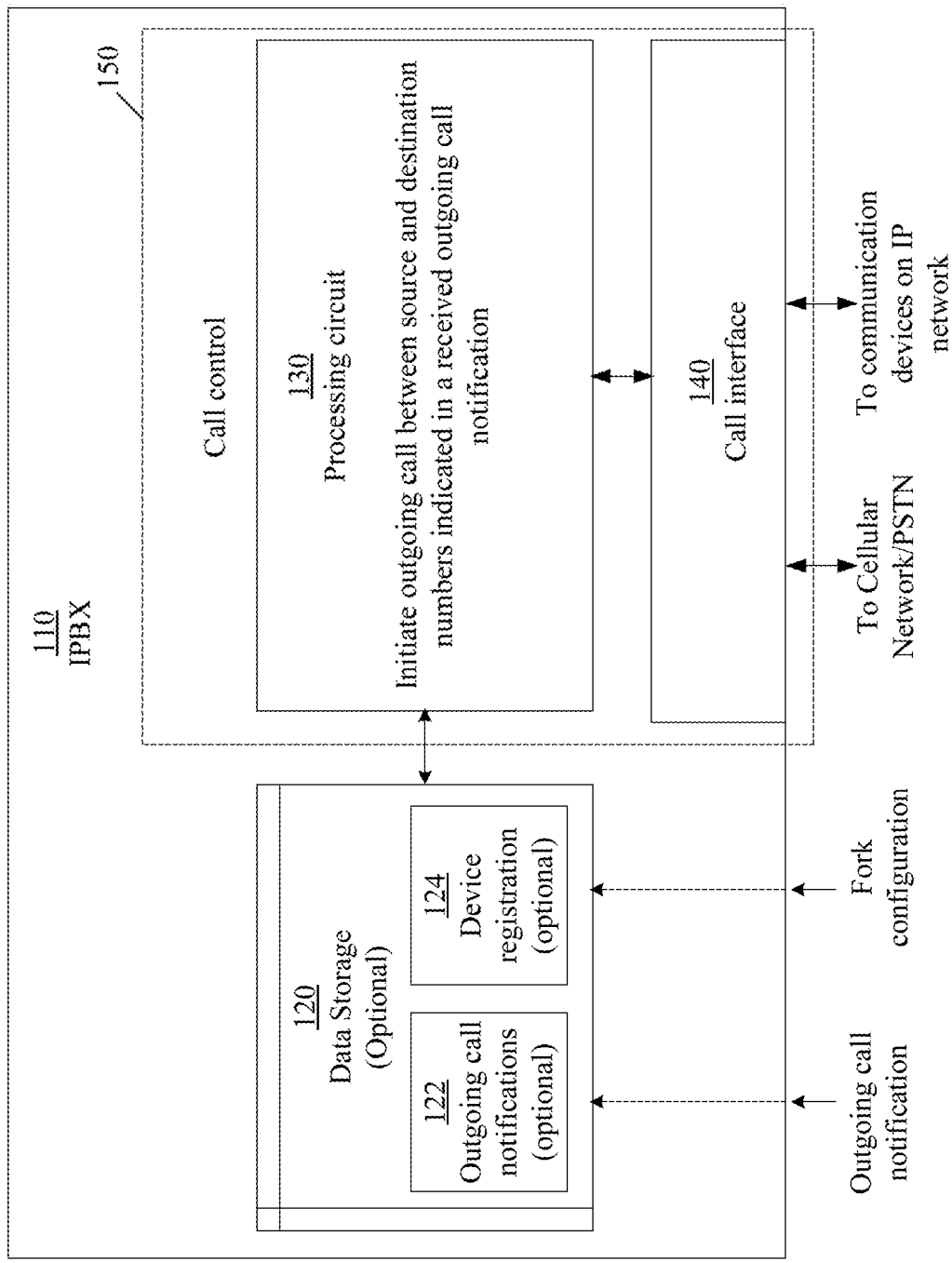
FIG. 1 shows an IPBX, configured in accordance with one or more embodiments.

While various embodiments are amenable to various modifications and alternative forms, specifics thereof have been shown by way of example in the drawings and will be described in detail. It should be understood, however, that the intention is not to limit the disclosure to the particular examples and embodiments described. On the contrary, the intention is to cover all modifications, equivalents, and alternatives falling within the spirit and scope of the disclosure.

DESCRIPTION

Aspects of the present disclosure are believed to be applicable to a variety of different types of apparatuses, systems, and methods involving telecommunication services. Some example implementations are directed to circuits, apparatuses, and methods for routing of phone calls in a private branch exchange PBX. A PBX routes calls between a service provider network (e.g., a cellular network or a public standard telephone network (PSTN)) and a plurality of telephone extensions. While the disclosed embodiments are not necessarily limited to such applications, various aspects of the present disclosure may be appreciated through a discussion of various examples using this context.

One type of PBX, known as an IP PBX (IPBX), routes calls between a service provider network and a plurality of communication devices on an IP network using voice-over-IP (VoIP), in which each communication is assigned a respective telephone extension. In some applications, an IPBX may also be configured to route calls to and from VoIP enabled mobile devices that are not directly connected to the network. Such mobile devices may place and receive VoIP calls via an extension of the IPBX. VoIP data may be communicated between the mobile devices and the IPBX via a data channel provided by cellular network providers or via WiFi hotspots. However, in some areas, WiFi hotspots may not be available and cellular networks may not provide sufficient bandwidth to support VoIP calls.

In one or more embodiments, an IPBX is configured to provide a mechanism for authorized mobile devices to place and/or receive calls via an extension of the IPBX when a data channel is not available for VoIP communication. More specifically, the IPBX provides a mechanism for authorized mobile devices to place and/or receive calls via an extension of the IPBX using a cellular network or a PSTN. This allows a user to place and/or receive calls via an extension number as though the mobile phone were a local communication device (IP phone) connected to an IPBX network. For instance, the IPBX may be configured to cause caller ID, for an outgoing call from a mobile device, to indicate a number and/or name associated with an IPBX extension instead of the number of the mobile device. Such caller ID capability may be advantageous for business persons conducting business away from the office. The ability to place outgoing calls via the IPBX may also reduce telecommunication costs. For instance, a business operating an IPBX may have contracted with a PSTN provider to receive discount rates for outgoing calls from the IPBX.

Various processes may be employed to allow a mobile device to make an outgoing call via the IPBX. In some embodiments, a first process is used to place an outgoing call for a mobile device via the IPBX. The outgoing call is setup by sending a call notification from a mobile device to the IPBX. The call notification indicates a source number of the mobile device and a destination number to be called. The IPBX caches the call notification in a first database. After successfully providing the notification to the IPBX, the mobile device calls a steering number, via a cellular network or PSTN.

The steering number is a telephone number that may be used to place a call to the IPBX via the cellular network or PSTN. In some implementations, the steering number is the main directory number used to receive and direct incoming calls. In some other numbers a separate number may be used as the steering number. If a separate number is used as the steering number, the IPBX may assume that each call to the steering number corresponds to a cached call notification and should be redirected. If the main directory number is used as the directory number, the IPBX checks the first database for each incoming call to see if it should be redirected as an outgoing call or routed as an incoming call. In some implementations, the steering number may be a predetermined number stored within the mobile device. For example, a smartphone application may be configured to place an outgoing call via the IPBX using the above described mechanism. The steering number may be specified in the programming of the smartphone application. In some other implementations, the steering number may be provided by the IPBX in an acknowledgement of the call notification. Use of the acknowledgement to provide the steering number allows the IPBX to easily change the steering number as needed. For example, the IPBX may change the steering number when a line previously used as the steering number must be disabled for service.

In response to the incoming call from the source number, the IPBX retrieves the cached call notification having the corresponding source number from the first database. The IPBX redirects the call to the destination number indicated in the retrieved call notification, via a cellular network or PSTN.

In some embodiments, a second process is used to place an outgoing call for a mobile device via the IPBX. Similar to the first process, the outgoing call is setup by sending the call notification from a mobile device to the IPBX. In response to the call notification, the IPBX places a first outgoing call to the source number indicated in the call notification and places a second outgoing call to the destination number indicated in the call notification. The IPBX then merges the first and second outgoing calls to connect the mobile device corresponding to the source number with a communication device corresponding to the destination number.

In some embodiments, the IPBX is configured to implement both the first and second processes. In some implementations, a mobile device may select the process that the IPBX should use to initiate the outgoing call via the IPBX. For instance, the call notification may include a mode selection field that may be used to select either the first process (mode A) or the second process (mode B).

In one or more embodiments, an IPBX may be configured to ring multiple devices of a user in response to incoming calls to an IPBX extension. For example, a user may configure the IPBX for their extension to ring their office phone and a specified mobile device at the same time. Such configurability may be advantageous for business persons who conduct business away from the office. For example, by configuring the IPBX to ring an office phone and a mobile device at the same time, a business person can avoid having to update call forwarding settings when they leave and return to the office.

In some embodiments, an IPBX is configured to route incoming calls according to a customizable routing policy for each extension. For example, the IPBX may be configured to fork a incoming call, indicating extension number, for routing to multiple devices associated with the extension. When a call is forked, the call is routed to two devices simultaneously, causing both devices to ring at the same time. In contrast, automated redirecting or forwarding of calls rings only one device at a time. In some implementations, the IPBX may include a database that indicates, for one or more extensions, to which mobile devices incoming calls are to be routed in addition to communication devices on the IP network that are assigned the extension. For instance, in response to an incoming call that does not correspond to a cached call notification, an entry corresponding to a telephone extension indicated by the call is retrieved from the database. The call is forked by routing the incoming call to a mobile device indicated in the retrieved entry and also routing the incoming call to a communication device on the IP network corresponding to the extension.

In various embodiments, the IPBX may route a forked call to the mobile device indicated in the retrieved entry as a standard phone call via a cellular network and/or PSTN or as a VoIP call via a data network. In some implementations, an entry in the database for the extension may include a field indicating whether the incoming calls should be routed to the mobile device as a standard call or as a VoIP call.

The mobile device may be configured to update/switch the field to indicate the preferred routing process for incoming calls to the extension based on connectivity status of the mobile device. In some implementations, the device may select the preferred mode based on sensed signal strength or measured bandwidth. For instance, the mobile device may select to use VoIP for routing incoming calls to the mobile device if a high bandwidth data channel is available, and otherwise select to use a standard call to route the incoming call to the mobile device. In some implementations, the device may select the preferred mode based on geographic location of the mobile device. For instance, a user may define geographic areas in which VoIP should be used for placing/receiving calls or define geographic areas in which cellular networks should be used for placing/receiving calls.

Similarly, in some embodiments, the mobile device may be configured to automatically request the IPBX to disable routing of incoming calls to the mobile device when certain criteria are satisfied. For example, a user may wish to disable routing of incoming calls to the mobile device during certain hours of the day (e.g., nighttime) or days of the week (e.g., weekends). As another example, a mobile device may request the IPBX to disable routing of incoming calls to the mobile device when the mobile device enters or exits certain geographic areas. As another example, a mobile device may request the IPBX to disable routing of incoming calls to the mobile device when environmental variables indicate that a user may be driving (e.g., GPS indicates mobile device is traveling at a high rate of speed).

For ease of explanation, the examples are primarily described with reference to an IPBX. However, the embodiments are not so limited. Rather, some disclosed aspects may be applicable to a variety of methods, systems, and apparatuses for routing of calls. For example, a conventional PBX may be adapted to place outgoing calls from mobile devices via the PBX, as discussed above.

Turning now to the figures, FIG. 1 shows an IPBX 110, configured in accordance with one or more embodiments. The IPBX 110 includes an interface circuit 140, configured to route calls between a cellular network and/or PSTN and a plurality of communication devices on an IP network. Each of the plurality of communication devices on the IP network corresponds to a respective telephone extension. The IPBX 110 also includes a processing circuit 130. In response to the IPBX 110 receiving a call notification from one of a plurality of mobile devices, the processing circuit 130 sets up an outgoing call between source and destination numbers indicated in the call notification. For ease of reference, the processing circuit 130 and the interface circuit 140 may be jointly referred to as a call control circuit 150.

In some implementations, the processing circuit 130 sets up an outgoing call between source and destination numbers by caching the call notification for a period of time in an outgoing call notification database 122. In this example, the outgoing call notification database 122 is stored on a data storage circuit 120 included in the IPBX 110. Alternatively, the outgoing call notification database 122 may be stored on an external storage circuit communicatively coupled to the IPBX 110. In response to the call interface receiving an incoming call over a cellular network and/or PSTN from the source number, the processing circuit 130 checks the outgoing call notification database 122 to see if it includes a cached call notification having the source number of the incoming call. The source number of the incoming call may be indicated by caller ID data provided by the cellular network or PSTN. If the outgoing call notification database 122 includes a cached call notification having the source number, the processing circuit 130 directs the interface circuit 140 to redirect the call to the destination number indicated in the call notification.

In some implementations, the processing circuit 130 sets up an outgoing call between source and destination numbers by placing a first outgoing call to the source number and a second outgoing call to the destination number via the cellular network and/or PSTN. The processing circuit then merges the first and second outgoing calls.

In some embodiments, the processing circuit 130 may control the interface circuit 140 to route incoming calls to a mobile device indicated in a device registration database 124. For example, the device registration database 124 may indicate, for one or more extensions, mobile devices to route incoming calls to, in addition to communication devices on the IP network that are assigned the extension. When an incoming call is received that does not correspond to a cached call notification, the processing circuit 130 may check the device registration database 124 to determine if the call should be forked to any additional devices. If the device registration database 124 includes an entry for the extension indicated in the incoming call, the processing circuit 130 directs the interface circuit 140 to route the call to a mobile device indicated by the entry and to a communication device on the IP network that corresponds to the extension. Otherwise, the interface circuit 140 routes the incoming call only to the communication device on the IP network that corresponds to the extension.

In some embodiments an IPBX is configured by default to route received calls for an extension number to a single communication device on an IP network (e.g., an IP phone assigned the extension number. Similarly, the IPBX is configured by default to only place outgoing calls via the extension number from the single communication device, to which the extension number is assigned. As described above, the IPBX may be configured to route incoming calls that indicate the extension number to one or more mobile devices, in addition to the corresponding communication device on an IP network. In some embodiments, the IPBX may be configured to route incoming calls for particular extension to a mobile device using a device registration process. An example registration process is described in more detail with reference to FIG. 2A in the following. The IBPX may be further configured, using outgoing call notification messages, to allow registered mobile devices to place outgoing calls via an extension of the IPBX. Call notification messages are described in more detail with reference to FIGS. 2B and 2C.

Figure 2A:
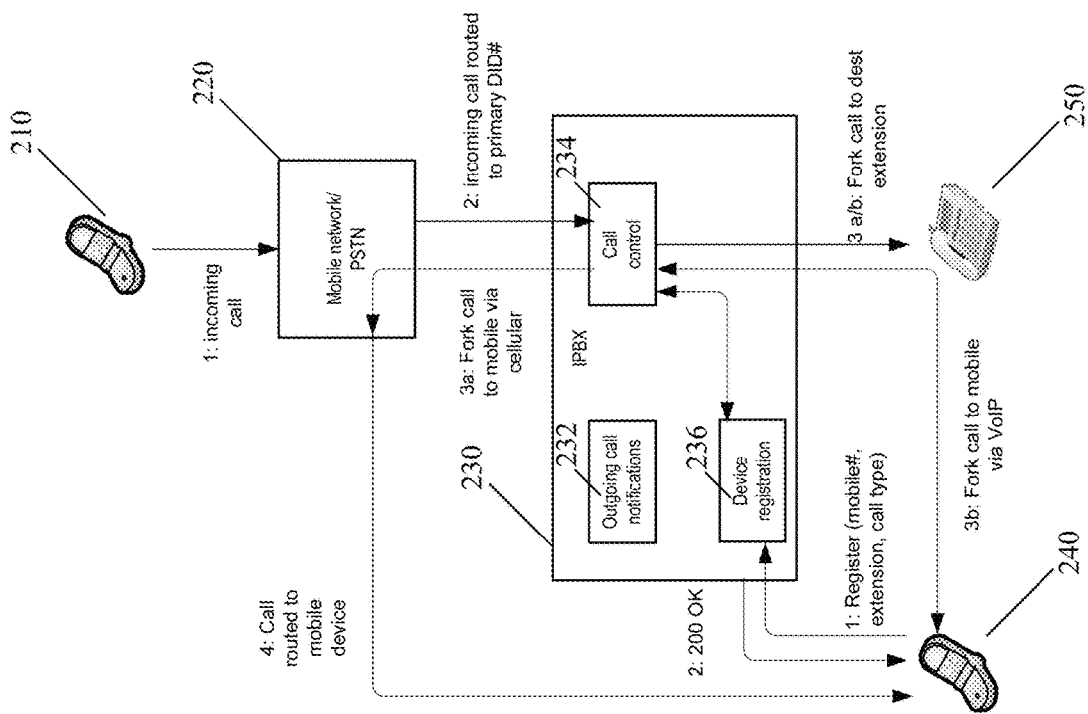
FIG. 2A shows an IPBX 230 configured to register mobile devices for routing of incoming calls for one or more extensions, consistent with one or more embodiments.
Figure 2B:
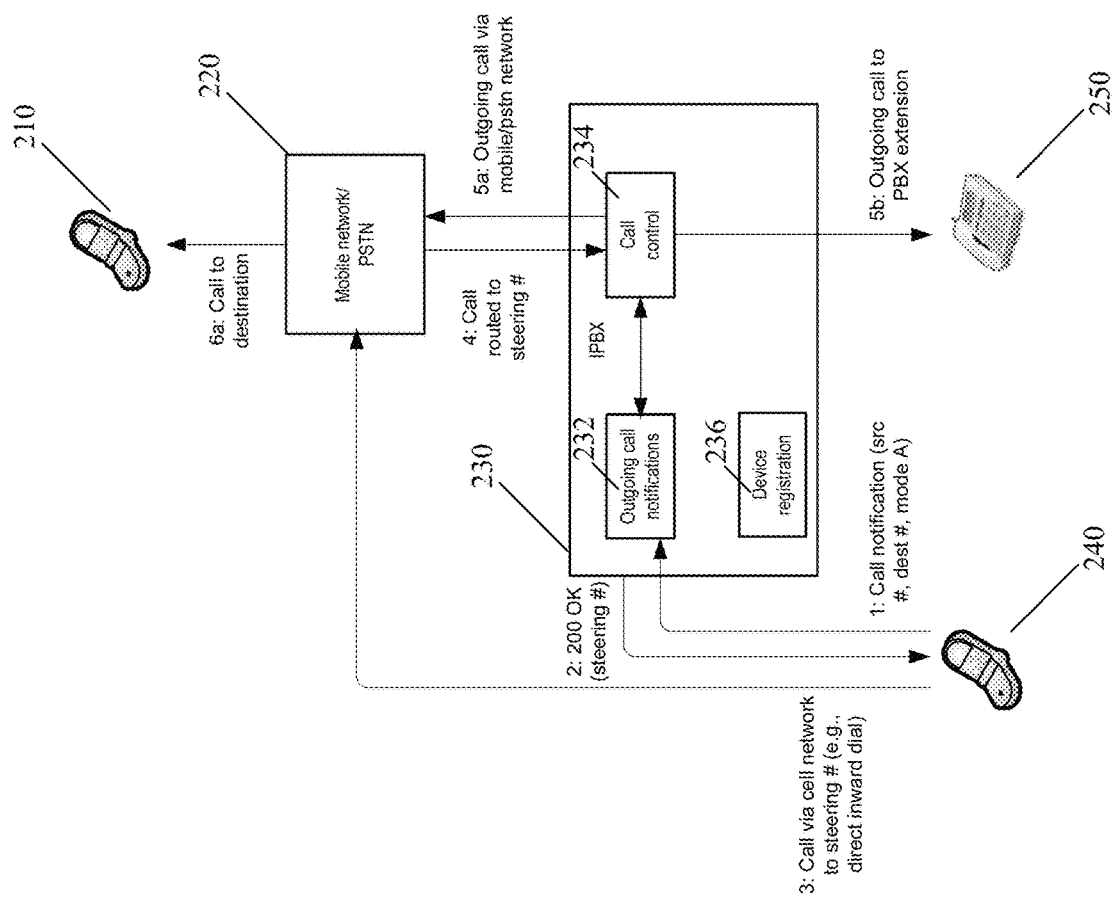
FIG. 2B shows an IPBX configured to place an outgoing call from a mobile device via a cellular network or PSTN using a first process, consistent with one or more embodiments.
Figure 2C:
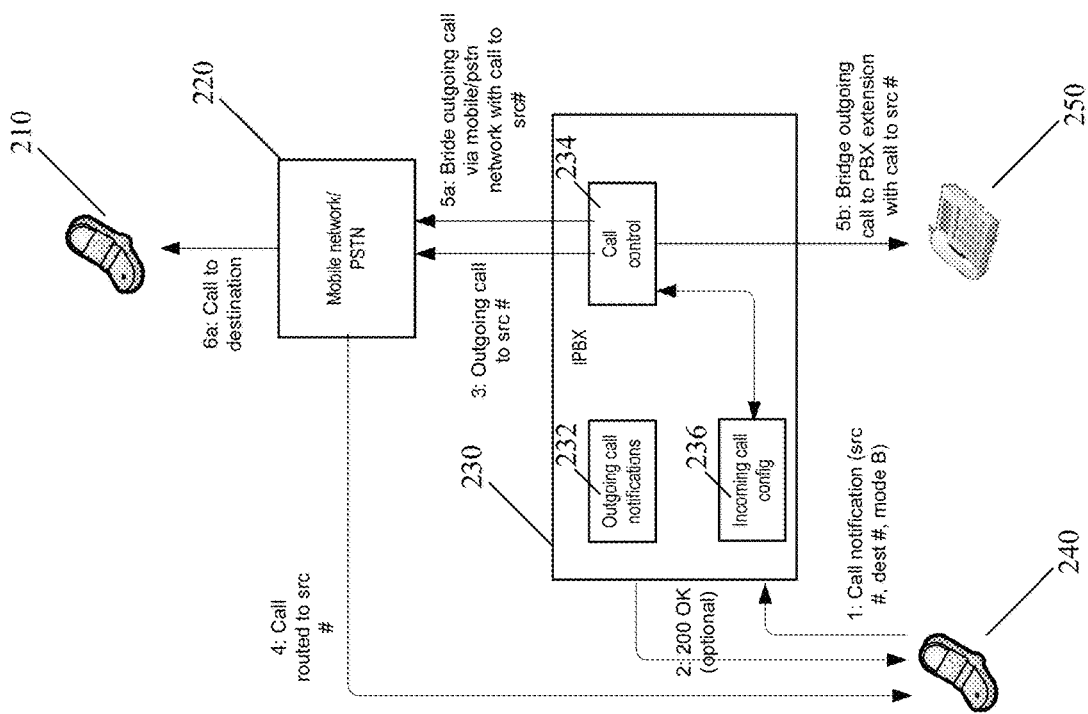
FIG. 2C shows an IPBX configured to place an outgoing from a mobile device via a cellular network or PSTN using a second process, consistent with one or more embodiments.

FIGS. 2A, 2B, and 2C illustrate registration of a mobile device with an IPBX and routing of incoming and outgoing calls in the IPBX in accordance with one or more embodiments. In this example, the IPBX 230 includes a call control circuit 234 for routing incoming and outgoing calls to/from the IPBX. In some embodiments, the call control circuit 234 may be implemented using the processing circuit 130 and the interface circuit 140, as discussed with reference to call control circuit 150 in FIG. 1. The IPBX also includes an outgoing call notification database 232 and an device registration database 236 to facilitate routing of calls by some of the disclosed processes.

In FIG. 2A a mobile device is registered with the IPBX 230 for routing of incoming calls for an extension. During the registration process, the mobile device 240 provides a registration message to the IPBX 230. The registration message indicates an IPBX extension and a mobile number to which incoming calls to the IPBX extension should be forked. The registration message also instructs the IPBX whether calls should be routed to the specified mobile number via SIP (VoIP) or via a cellular network or PSTN.

An example registration message is shown in Example 1. In this example, an IPBX extension is specified in the SIP field (shown in bold) under the f: header of the message. The mobile number is specified in the MN field (also shown in bold) under the X-Attributes header. The mobile routing preference is specified under the MR field (also shown in bold) under the X-Attributes header. In this example, the MR field is set to cell, which indicates that incoming calls should be directed to the mobile number via a cellular network. The MR field may be set to SIP if incoming calls should be directed to the mobile number using VoIP.

REGISTER sip:ipsbc.packet8.net SIP/2.0
i:                      d9291d4-29d79820-ddf2d4d1-ac19f3c@ipsbc.packet8.net
f:   <sip:08520555440@ipsbc.packet8.netuser=phone>; tag=715b00d0-1606d9e0ddf2d4d1
t: <sip:08520555440@ipsbc.packet8.netuser=phone>
CSeq: 100 REGISTER
v: SIP/2.0/TCP
10.193.0.240:40524; branch=z9hG4bK.440573f3.14db6c80.ddf2d52d; rport;alias
m:        <sip:08520555440@10.193.0.240:40524; user=phone>
Max-Forwards: 70
User-Agent: iPhone SIP/4.3-BETA4
X-Attributes:   *;   codec=ILBC:102,PCMU:0,PCMA:8, TELEPHONE-EVENT:101,H264:109; mn=14088583349;mr=cell
Expires: 1200k: path
l: 0

Example 1

Referring again to FIG. 2A, information from the registration message is placed by the call control circuit 234 as an entry in the device registration database 236. The entry may indicate, for example, a telephone extension, the number of the mobile device 240, and optionally, the type of call (e.g., VoIP or standard call) that should be used to route calls to the mobile device 240. Upon storing the entry in the device registration database 236, an acknowledgement message may be provided to confirm that configuration has successfully been modified.

An example acknowledgement message is shown in Example 2. In some embodiments, the acknowledgement message may indicate whether or not the IPBX provides support for the mobile device to place outgoing calls via the IPBX. In this example, header K: (shown in bold) includes "cellular-call-control" to indicate that outgoing calls from the mobile device is supported. Absence of the "cellular-call-control" from the acknowledgement may be used to indicate that outgoing calls from the mobile device is not supported.

SIP/2.0 200 OK
User-Agent: Intraswitch/SP14.3.6 SCF-7 Engine/0.2.8
Expires: 1200CSeq: 101 REGISTER
Record-Route: <sip:192.84.18.162:5199;lr>
f:    <sip:08520555440@ipsbc.packet8.netuser=phone>; tag=715b00d0-1606d9e0ddf2d4d1
t:    <sip:08520555440@ipsbc.packet8.netuser=phone>; tag=56c1045c-64b3-9913-9738-5629689215bd
k: cellular-call-control
Server: Intraswitch/SP14.3.6 SCF-7 Engine/0.2.8
m:            <sip:08520555440@10.193.0.240:40524; user=phone>
i:                       d9291d4-29d79820-ddf2d4d1-ac19f3c@ipsbc.packet8.net
v: SIP/2.0/TCP
10.193.0.240:40524;alias;rport=21462; branch=z9hG4bK41ff7968.14e1f6d0.ddf2d606;received=8.5.249.46
l: 0

Example 2

Referring again to FIG. 2A, in response to the IPBX 230 receiving an incoming call from communication device 210 via the cellular network and/or PSTN 220, the call control circuit 234 checks the device registration database 236 to determine if the call should be forked to any registered devices. If the device registration database 236 includes an entry having the extension indicated in the incoming call, the call control circuit 234 routes the call to the number of the mobile device indicated in the entry. The call control circuit 234 also routes the call to a communication device 250 on the IP network that corresponds to the extension. Otherwise, if the device registration database 236 does not include an entry having the extension, the call is routed only to the communication device 250 on the IP network that corresponds to the extension.

In this example, the registration information place into the device registration database 236 is provided by the mobile device 240. Alternatively or additionally, devices may be registered in the device registration database using a number of devices and/or interfaces (e.g., desktop computers or IP phones). In some embodiments, the IPBX may provide a web-based graphical-user-interface (GUI) provided by a desktop computer application and/or web-based application for registration of devices in the device registration database 236.

FIG. 2B shows the IPBX 230 configured to place an outgoing call from a registered mobile device via a cellular network or PSTN using a first process, consistent with one or more embodiments. A mobile device 240 provides an output call notification to the IPBX 230. The call notification includes a source number, a destination number, and a mode indicator. An example of an outgoing call notification message is shown in Example 3. The source number, destination number, and mode indicator are shown in bold.

NOTIFY sip:08520463106@ipsbc.packet8.net SIP/2.0
i: 5c3b0f3-2dac7500-de0eb030-ac0b492@ipsbc.packet8.net
f: <sip:08520463106@ipsbc.packet8.netuser=phone>; tag=72962479-16d6c5dOdeOeb030
t: sip:08520463106@ipsbc.packet8.net
CSeq: 100 NOTIFY
v: SIP/2.0/TCP
10.192.12.166:42988; branch=z9hG4bK.5f34beb4.16d64a10.de0eb030;rportalias
m: <sip:08520463106@10.192.12.166:42988; user=phone>
Max-Forwards: 70
User-Agent: iPhone SIP/4.3-BETA4
c: text/plain
l: 93
src_number=14088583349
dst_number=12345678910
mode=A
tag=0bb1b271bd0dc0a7d67ca3771df211b4

Example 3

In the example shown in FIG. 2B, the mode indicator indicates a first mode (mode A), which indicates that the mobile device 240 is requesting to place an outgoing call via the IPBX 230 using the first call redirect process discussed above. The destination number in the call notification is provided to the mobile device 240 via user input. The source number of the mobile device may be determined by the mobile device 240 using a number of techniques. For example, the source number may be specified by a user or may be retrieved from an operating system of the mobile device (e.g., iOS or Android). As another example, the source number may be determined by calling a call server that is configured to detect the source number and to provide the detected source number back to the mobile device.

If the IPBX 230 supports the call redirect function, the IPBX 230 caches the call notification in the outgoing call notification database 232 and provides an acknowledgement (e.g., 200 OK message) to the mobile device 240. The acknowledgement may serve multiple purposes. In this example, the acknowledgement notifies the mobile device 240 that the call notification has been successfully received and registered and also provides a steering number to the mobile device. In some other implementations, for example, a steering number may be hardcoded in a program executed on the mobile device. An example acknowledgement to the outgoing call notification is shown in Example 4. The steering number provided in the notification is shown in bold.

SIP/2.0 200 OK
User-Agent: Intraswitch/SP14.3.6 SCF-7 Engine/0.2.8
CSeq: 101 NOTIFY
Record-Route: <sip:192.84.18.162:5199;lr>
f: <sip:08520463106@ipsbc.packet8.netuser=phone>; tag=72962479-16d6c5d0de0eb030
t: <sip:08520463106@ipsbc.packet8.net>;tag=7fef2e15-aafa-17d9-01c3-57e677052b2a
c: text/plain
Server: Intraswitch/SP14.3.6 SCF-7 Engine/0.2.8
i: 5c3b0f3-2dac7500-de0eb030-ac0b492@ipsbc.packet8.net
v: SIP/2.0/TCP
10.192.12.166:42988;alias;rport=15066; branch=z9hG4bK.7fd44c40.16eb8050.de0ec3f2;received=192.84.19.225
l: 41
steering_number=14086540997
rsp_code=200

Example 4

In response to receiving the acknowledgement (200 ok) from the IPBX 230, the mobile device 240 places a call to the steering number via a cellular network or PSTN 220. In response to the incoming call to the steering number, the call control circuit 234 retrieves the cached call notification from the outgoing call notification database 232 and redirects the call to the destination number indicated in the retrieved call notification. If the destination number corresponds to an extension of the IPBX, the call is redirected to communication device 250, corresponding to the extension. Otherwise, the control circuit redirects the call to communication device 210, corresponding to the destination number via the cellular network and/or PSTN 220.

FIG. 2C shows the IPBX 230 configured to place an outgoing call from a mobile device via a cellular network or PSTN using a second process, consistent with one or more embodiments. The mobile device 240 provides an output call notification to the IPBX 230. As indicated above, the call notification includes a source number, a destination number, and a mode indicator. In this example, the mode indicator indicates a second mode (mode B), which indicates that the mobile device 240 is requesting to place an outgoing call via the IPBX 230 using the second process discussed above.

If the IPBX 230 supports the second process (mode B), the IPBX 230 may optionally provide an acknowledgement message to the mobile device 240. In some embodiments, the IPBX 230 may provide an error message to the mobile device 240, if the IPBX receives outgoing call notification indicating an unsupported mode. If the IPBX 230 supports the second process (mode B), the call control circuit 234 places a first outgoing call to the source number and a second outgoing call to the destination number via the cellular network and/or PSTN 220. The call control circuit 234 then merges the first and second outgoing calls.

Figure 3:
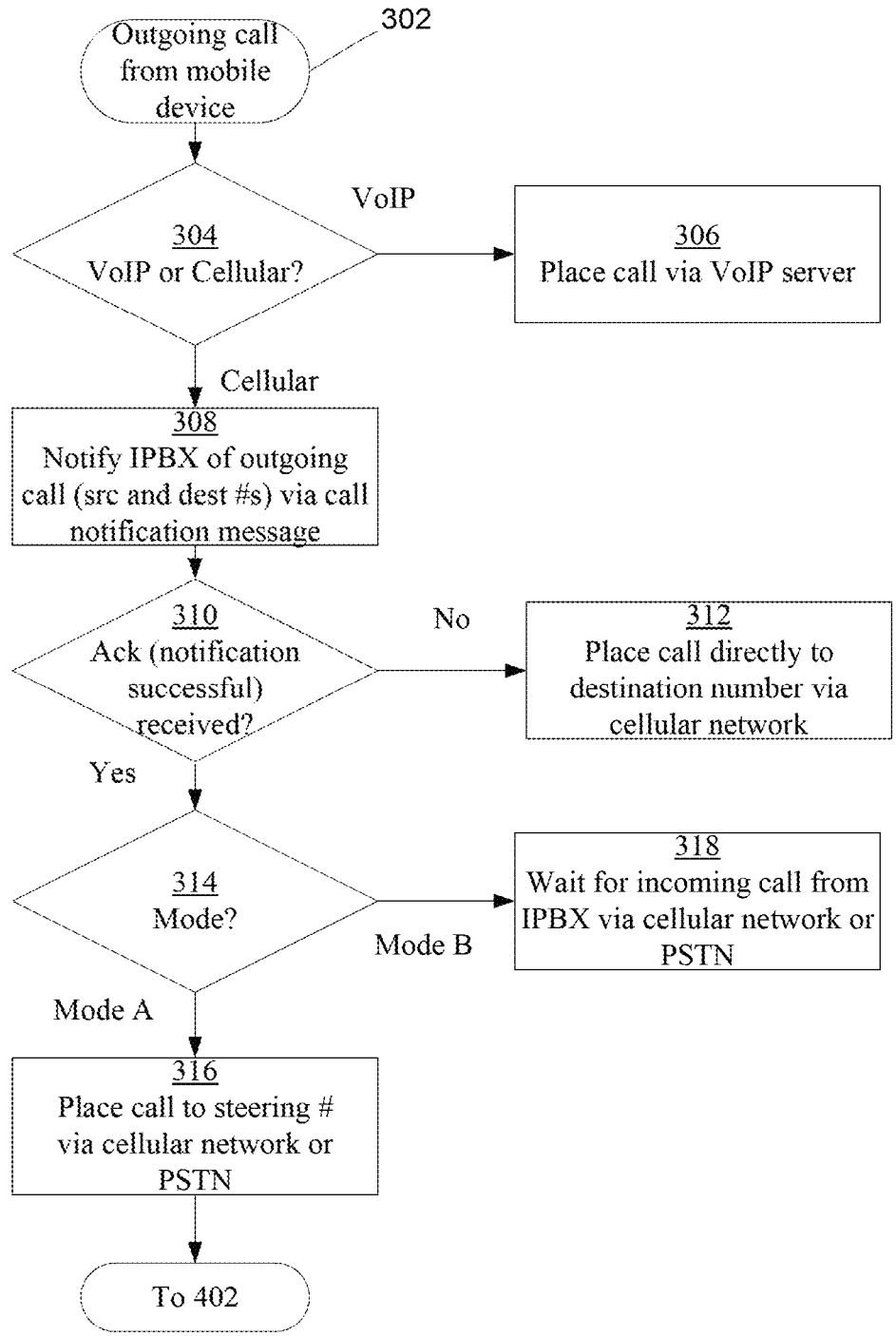
FIG. 3 shows a process for operating a mobile device, consistent with one or more embodiments.

FIG. 3 shows a process for operating a mobile device, consistent with one or more embodiments. The process is initiated by a user instruction 302 to place an outgoing call from the mobile device. If the call is a VoIP call, decision block 304 directs the process to place the call via a VoIP server at block 306. Otherwise, decision block 304 directs the process to notify the IPBX of the outgoing call at block 308. As with reference to FIG. 1, the IPBX may be notified by providing a call notification message to the IPBX. As discussed above, the IPBX will provide an acknowledgement to the mobile device to indicate that registration was successful and that the requested mode is supported. If no acknowledgement is received, decision block 310 directs the process to place a call directly to the destination number via the cellular network at block 312. If an acknowledgement is received indicating that registration of the outgoing call was successful, decision block 310 directs the process to decision block 314. If the call notification message requested to initiate the call using the first process (mode A), decision block 314 directs the process to place a call to the steering number at block 316. The call to the steering number initiates the process shown in FIG. 4 starting at block 402.

If the call notification message requested to initiate the call using the second process (mode B), decision block 314 directs the process to wait for an incoming call to be received from the IPBX at block 318.

The process shown in FIG. 3 may be performed as an automated process, for example, by an application executed on an operating system of a mobile device, (e.g., a smartphone). Such an application may include a graphical user interface similar to that used by the device to place outgoing calls. For example, in some implementations, a user may only need to input a number to be called into the application and wait for the application and the IPBX to initiate the outgoing call. From the user perspective, the call may be connected (e.g., via the steering number) as though the user had directly called the destination number as performed at block 312. However, some mobile phone operating systems may display a message indicating the steering number when the call is placed at block 316. To avoid confusion, in some implementations, the application may be configured to modify the message to instead display the destination number input by the user, or to display a message indicating that the call is being redirected via the steering number.

Figure 4:
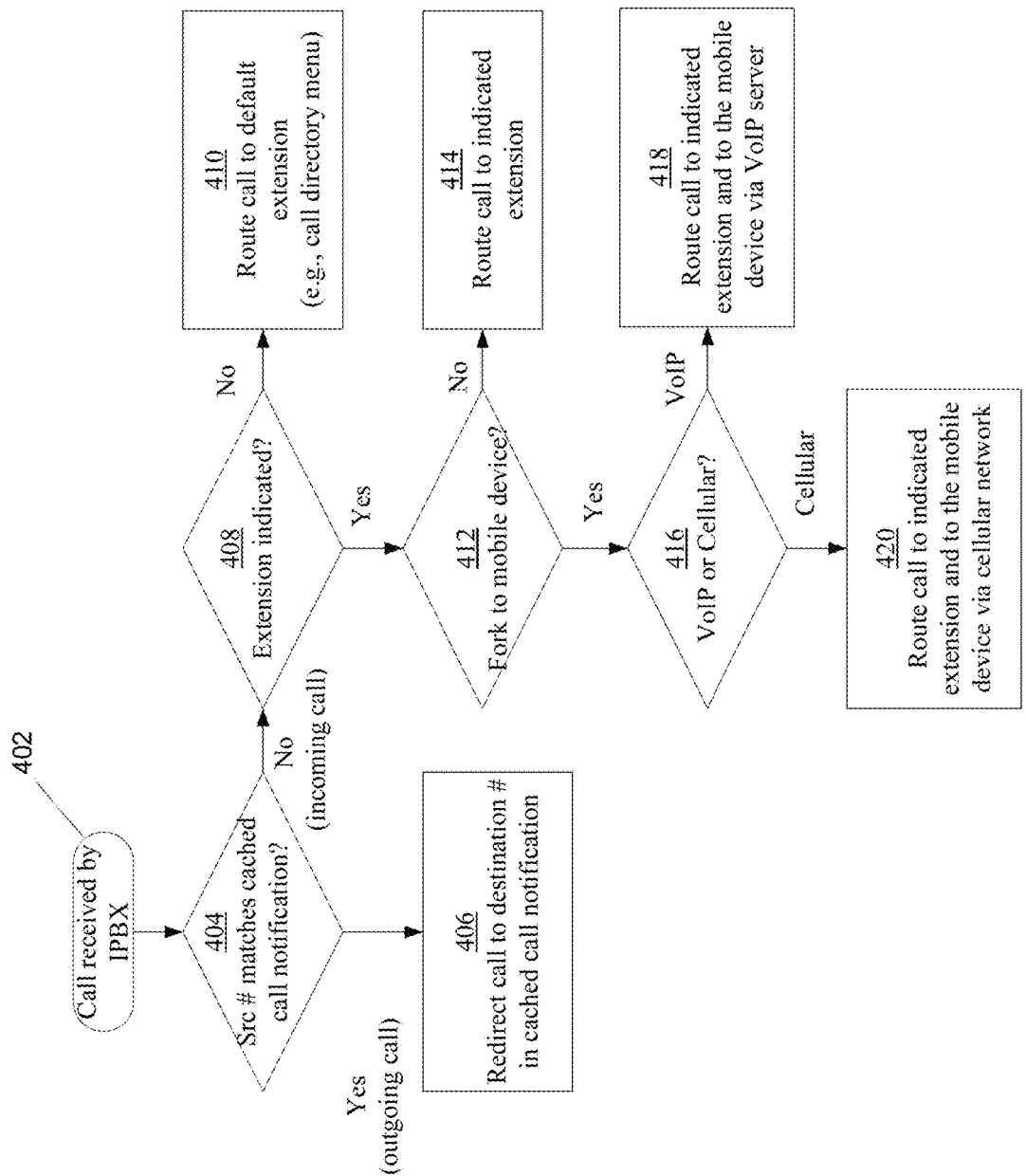
FIG. 4 shows a process for routing calls received by an IPBX, consistent with one or more embodiments.

FIG. 4 shows a process for routing calls received by an IPBX, consistent with one or more embodiments. The process is initiated when a call is received at block 402 by the IPBX. As discussed with reference to FIGS. 2A and 2B, the received call could be an incoming call or may correspond to a call notification indicated in an outgoing call notification database (e.g., 232). If the source number of the call matches a cached call notification in the outgoing call notification database, decision block 404 directs the process to block 406, where the call is redirected to the destination number indicated in the cached call notification. If the source number of the call does not match a cached call notification in the outgoing call notification database, decision block 404 directs the process to decision block 408. If an extension is not indicated in the incoming call, decision block 408 directs the process to route the call to a default extension (e.g., a call directory menu or customer service extension) at block 410. Otherwise, the process proceeds to decision block 412.

As discussed with reference to FIG. 1, a device registration database (e.g., 124) may indicate, for one or more extensions, a respective mobile device to which calls should be forked. The device registration database may also indicate the type of call (VoIP or standard) that should be used to route the call to the mobile device. At decision block 412, if calls to the extension are not to be forked to any mobile device, the call is routed at block 414 to a communication device on the IP network corresponding to the indicated extension. Otherwise, the process proceeds to decision block 416. If the device registration database indicates that the call is to be forked to a specified mobile device using VoIP, decision block 416 directs the process to block 418. At block 418, the call is routed to the communication device on the IP network corresponding to the indicated extension and to the specified mobile device using VoIP. If the device registration database indicates that the call is to be forked to the specified mobile device using a cellular network, decision block 416 directs the process to block 420. At block 420, the call is routed to the communication device on the IP network corresponding to the indicated extension and to the specified mobile device using a cellular network.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., a call control circuit). For example, in certain of the above-discussed embodiments, one or more modules are discrete logic circuits or programmable logic circuits configured and arranged for implementing these operations/activities, as in the blocks shown in FIGS. 1, 3, and 4. In certain embodiments, such a programmable circuit is one or more computer circuits programmed to execute a set (or sets) of instructions (and/or configuration data).

The instructions (and/or configuration data) can be in the form of firmware or software stored in and accessible from a memory (circuit). As an example, first and second modules include a combination of a CPU hardware-based circuit and a set of instructions in the form of firmware, in which the first module includes a first CPU hardware circuit with one set of instructions and the second module includes a second CPU hardware circuit with another set of instructions. Certain embodiments are directed to a computer program product (e.g., nonvolatile memory device), which includes a machine or computer-readable medium having stored thereon, instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the invention, including aspects set forth in the claims.

What is claimed is:

1. An apparatus, comprising:
   an interface circuit, configured to route data calls, via Internet protocol, between a cellular network or public standard telephone network (PSTN) and a plurality of communication devices on an IP network, each of the plurality of communication devices including communications circuitry and being assigned a respective one of a plurality of telephone extensions; and
   a processing circuit configured and arranged to:
   for each of the telephone extensions, perform default private branch exchange routing services, including:
      in response to an incoming call to the telephone extension, routing the call via the IP network to one of the plurality of communication devices that is assigned the telephone extension; and
      placing outgoing calls via the telephone extension from one of the plurality of communication devices that is assigned the telephone extension; and
   for one or more of the plurality of telephone extensions, place an outgoing call via the telephone extension from one of a plurality of mobile devices not included in the plurality of communication devices and that is not part of the IP network, by performing operations including:
      in response to receiving, from the mobile device, a call notification indicating a source number of the mobile device and a destination number, caching the call notification for a period of time in a first database; and in response to a first call to the cellular network or PSTN from the source number indicated by the call notification that is cached in the first database, redirecting the first call to the destination number indicated in the call notification such that the first call appears as an outgoing call originating from the telephone extension, instead of the first call appearing as originating from the source number of the mobile device via the cellular network or PSTN, wherein the outgoing call originates from the respective one mobile device that is not included in the plurality of communication devices; and a data storage circuit configured and arranged to store the first database.

2. The apparatus of claim 1, wherein the first call is placed by a user of the mobile device as the outgoing call to the destination number and provided by the mobile device as the first call to the cellular network or PSTN, wherein the processing circuit is further configured and arranged to:

in response to receiving the call notification indicating the source number and the destination number, provide to the mobile device, a steering telephone number that directs calls to the IP network from the cellular network or PSTN; and wherein redirecting the first call to the destination number such that the first call appears as the outgoing call includes providing a caller identification with the outgoing call to indicate at least one of a number and a name associated with an Internet Protocol Private Branch Exchange extension and which is provided in place of a number of the mobile device.

3. The apparatus of claim 1, wherein the plurality of mobile devices are unregistered within the IP network and wherein:

the call notification further includes a mode indicator; and the processing circuit is configured and arranged to:
perform the caching of the call notification in response to the mode indicator having a first value; and
in response to the mode indicator having a second value
initiate a first outgoing call to the source number of the mobile device via the cellular network or PSTN;
initiate a second outgoing call to the destination number via the cellular network or PSTN; and
merge the first and second outgoing calls.

4. The apparatus of claim 1, wherein the processing circuit is further configured and arranged to, in response to receiving an incoming call having a source number that is not included in the first database and having a destination number indicating a telephone extension corresponding to one of the plurality of communication devices:

retrieve an entry corresponding to the telephone extension from a second database stored on the data storage circuit;

route the incoming call to one of the plurality of mobile devices that is indicated in the retrieved entry; and route the incoming call to the one of the plurality of communication devices corresponding to the telephone extension.

5. The apparatus of claim 4, wherein the processing circuit is further configured and arranged to route the incoming call to the one of the plurality of mobile devices via the cellular network or PSTN.

6. The apparatus of claim 4, wherein the processing circuit is further configured and arranged to route the incoming call to the one of the plurality of mobile devices using the Internet protocol.

7. The apparatus of claim 4, wherein the second database includes at least one entry indicating a telephone number to which calls to a telephone extension are to be redirected.

8. The apparatus of claim 1, wherein the processing circuit is further configured and arranged to, in response to receiving an incoming call having a source number that is not included in the first database and having a destination number that does not indicate a telephone number extension, route the call to a default telephone extension.

9. The apparatus of claim 1, further comprising the one of the plurality of mobile devices corresponding to the source number, wherein the one of the plurality of mobile devices is configured and arranged to initiate a call to the destination number by:

providing the call notification to the processing circuit, and in response to receiving an acknowledgment message from the processing circuit, placing a call to a steering number included in the acknowledgment message.

10. A method for routing calls on an IP network, including a plurality of communication devices on an IP network, each of the communication devices being assigned a respective one of a plurality of telephone extensions, comprising:

for each of the plurality of telephone extensions performing default private branch exchange routing services including:

in response to an incoming call a cellular network or public standard telephone network (PSTN) to the telephone extension assigned to the communication device, routing the call via the IP network to one of the plurality of communication devices that is assigned the telephone extension; and placing outgoing calls via the telephone extension from one of the plurality of communication devices that is assigned the telephone extension; and for one or more of the plurality of telephone extensions, placing an outgoing call via the telephone extension from one of a plurality of mobile devices not included in the plurality of communication devices, by performing operations including:

in response to receiving a call notification from the one of the plurality of mobile devices, storing the call notification for a period of time in a first database, the call notification indicating a source number and a destination number; and in response to receiving a first call via the cellular network or PSTN from the source number indicated in the call notification that is stored in the first database, redirecting the first call to the destination number indicated in the call notification as an outgoing call that appears as originating from telephone extension via the cellular network or PSTN.

11. The method of claim 10, further comprising routing data calls, via Internet protocol, to and from the plurality of mobile devices, wherein redirecting the first call to the destination number further includes providing a caller identification with the outgoing call to indicate at least one of a number and a name associated with an Internet Protocol Private Branch Exchange extension, such that the first call appears as an outgoing call originating from the telephone extension via the cellular network or PSTN.

12. The method of claim 10, wherein:
the call notification includes a mode indicator;

the storing of the call notification for the period of time in the first database is performed in response to the mode indicator having a first value; and further comprising, in response to the mode indicator having a second value,
- initiating a first call to the source number via the cellular network or PSTN,
- initiating a second call to the destination number via the cellular network or PSTN, and
- merging the first and second calls.

13. The method of claim 10, further comprising, in response to a second call having a source number that is not included in the first database and having a destination number indicating a telephone extension corresponding to one of the plurality of communication devices:
- retrieving an entry corresponding to the telephone extension from a second database;
- routing the second call to one of the plurality of mobile devices that is indicated in the retrieved entry and that is associated with the destination number; and
- routing the second call to the one of the plurality of communication devices corresponding to the telephone extension indicated by the destination number, wherein the second call is simultaneously routed to the one of the plurality of mobile devices and the one of the plurality of communication devices.

14. The method of claim 13, further comprising routing the second call to the one of the plurality of mobile devices via the cellular network or PSTN.

15. The method of claim 13, further comprising routing the second call to the one of the plurality of mobile devices using Internet protocol.

16. The method of claim 13, wherein the second database includes at least one entry indicating a telephone number to which calls to a telephone extension are to be routed.

17. The method of claim 10, further comprising, in response to a third call having a source number that is not included in the first database and having a destination number that does not indicate a telephone number extension, routing the third call to a default telephone extension.

18. A method for routing calls on an IP network, including a plurality of communication devices on an IP network, each of the communication devices being assigned a respective one of a plurality of telephone extensions, comprising:
for each of the plurality of telephone extensions performing default private branch exchange routing services including:
- in response to an incoming call via a cellular network or public standard telephone network (PSTN) to the telephone extension assigned to the communication device, routing the call via the IP network to one of the plurality of communication devices that is assigned the telephone extension; and
- placing outgoing calls via the telephone extension from one of the plurality of communication devices that is assigned the telephone extension; and for one or more of the plurality of telephone extensions, placing an outgoing call via the telephone extension from one of a plurality of mobile devices not included in the plurality of communication devices by performing operations including, in response to receiving from the one of a plurality of mobile devices, a call notification, indicating a source number, a destination number, and a mode indicator identifying a process to be used to place the outgoing call;
- initiating a first outgoing call to the source number via the cellular network or PSTN;
- initiating a second outgoing call to the destination number via the cellular network or PSTN; and
- merging the first and second outgoing calls.

19. The method of claim 18, wherein placing the outgoing call via the telephone extension from one of the plurality of mobile devices further includes providing a caller identification with the outgoing call to indicate at least one of a number and a name associated with an Internet Protocol Private Branch Exchange extension, such that the outgoing call appears as originating from the telephone extension via the cellular network or PSTN, and wherein:
the initiating and merging of the first and second outgoing calls is performed in response to the mode indicator having a first value, and further comprising,
- in response to the mode indicator having a second value, storing the call notification for a period of time in a database; and
- in response to an incoming call via the cellular network or PSTN from the source number indicated by the call notification that is stored in the database, redirecting the call to the destination number indicated in the call notification via the cellular network or PSTN.

20. The method of claim 18, further comprising:
in response to an incoming call having a destination number indicating a telephone extension corresponding to one of the plurality of communication devices,
- retrieving an entry corresponding to the telephone extension, indicated by the destination number of the incoming call, from a database;
- routing the incoming call to a mobile device that is indicated in the retrieved entry; and
- routing the incoming call to the one of the plurality of communication devices corresponding to the telephone extension.

* * * * *